Patented June 12, 1951

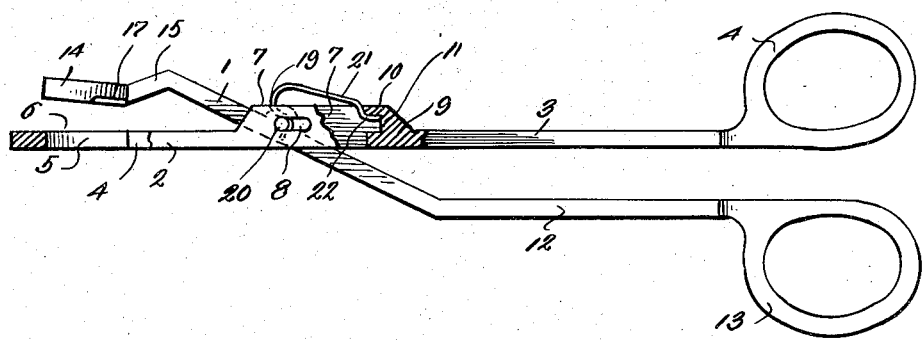
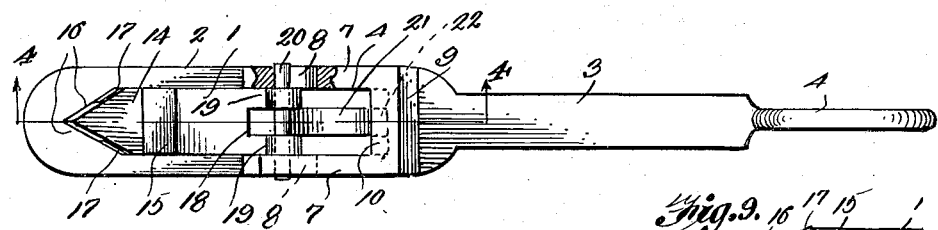
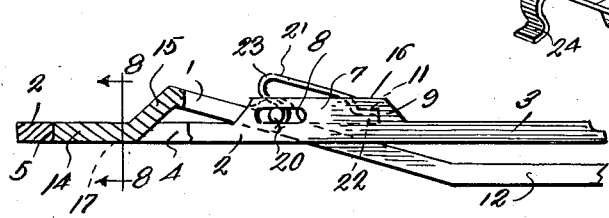
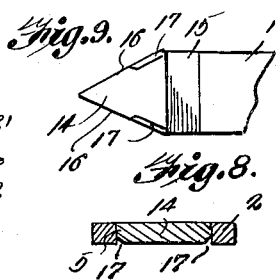
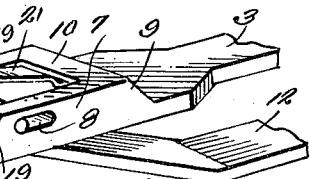
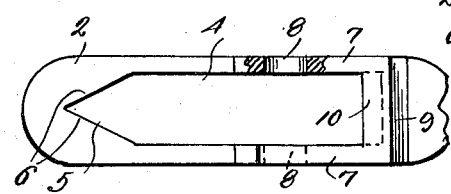
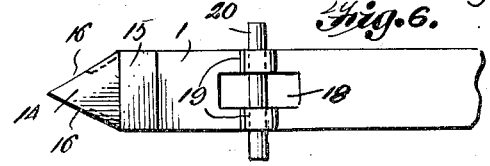

2,556,819

UNITED STATES PATENT OFFICE 2,556,819

NOTCHING SCISSORS

Yolanda Helen Musselwhite and Joseph Arthur Musselwhite, Washington, D. C.

Application June 21, 1949, Serial No. 100,412

3 Claims. (Cl. 30—229)

This invention relates to cutlery and more particularly to an implement which is operated in a manner similar to a pair of shears or scissors and is used for forming notches in marginal portions of dress goods cut by means of a pattern pinned flat upon the dress goods.

Patterns used for cutting dress goods are marked along their edges with V-shaped marks or notches and after the goods is cut notches are formed at these points which are V-shaped and serve as guides so that edges of the goods may be folded to form seams, the notches also serving as guides in order that companion cut pieces or elements of a dress or other garment may be accurately assembled. Care must be taken when cutting the dress goods to form the notches as the notches may be of a predetermined depth in order to form a seam of the proper width and a correct seam formed when sewing companion portions of the garment together. Often the notches are not properly cut, thus spoiling the dress goods and considerable time and care is required in order to accurately cut the notches.

Therefore one object of the invention is to provide an implement by use of which notches may be quickly and accurately formed and without special skill by the person using the notching implement.

Another object of the invention is to provide an implement which is used in the same manner as a pair of scissors or shears and will thus be very easy to operate.

Another object of the invention is to provide a notching implement having male and female jaws or blades, the female blade being formed with an opening through which the male blade passes and is pivotally mounted so that they may have tilting movement imparted to them by handles corresponding to scissors' handles and the blades caused to cut V-shaped notches in marginal portions of a pattern.

Another object of the invention is to provide the implement with blades so constructed that the male blade may be shifted longitudinally in the opening of the female blade as it moves towards a cutting position and thus allow the tapered end of the male blade to be moved into position to fit snugly in the tapered front end portion of the slot or opening and accurately form a V-shaped notch in the marginal positions of a pattern cut from dress goods.

Another object of the invention is to provide a spring which urges the male blade forwardly and is of such construction that it may be firmly mounted upon the rear portion of the female blade back of the slot or opening through which the male blade passes.

Another object of the invention is to provide notching scissors which are of simple construction, easy to operate and which may be manufactured at low cost.

The invention is illustrated in the accompanying drawings wherein:

Fig. 1 is a view showing the improved notching scissors principally in side elevation and partially in longitudinal section with the male blade in its normally raised position.

Fig. 2 is a top plan view of the notching scissors, a portion of the female blade being in section.

Fig. 3 is a fragmentary view partially in side elevation and partially in longitudinal section and showing the male blade in its cutting position.

Fig. 4 is a fragmentary sectional view taken along the line 4—4 of Figure 2.

Fig. 5 is a top plan view of the female blade with a portion in section.

Fig. 6 is a top plan view of the male blade.

Fig. 7 is a perspective view looking down upon the notching scissors with the shanks of the blades broken off.

Fig. 8 is a transverse section taken along the line 8—8 of Figure 3.

Fig. 9 is a bottom plan view of the male blade.

Fig. 10 is a perspective view of the spring which yieldably holds the male blade in its normally raised position.

This improved notching scissors has two companion blades 1 and 2 which are formed of steel and may be referred to as a male blade 1 and a female blade 2. The female blade is elongated longitudinally of the scissors and has a rearwardly extending shank 3 provided at its rear end with a handle 4. The blade 2 is flat throughout its length, as is also its shank 3 and in this blade is formed a slot or longitudinally extending opening 4 having its forward portion 5 tapered to a point at its front end providing the slot with a V-shaped terminal portion having sharpened side edges 6. Upstanding flanges 7 extend along opposite sides of the rear portion of the opening 4 and are formed near their front ends with oppositely disposed longitudinally extending slots 8. Between rear ends of the side flanges extends a rear flange of cross bar 9 having a forwardly projecting lip 10 defining a seat 11 which is open at its front and closed at its opposite sides by the side flanges. The female blade and its shank and handle are therefore formed as a single unit. The male blade 1 has a shank 12 which is provided at its rear end with a handle 13 disposed under the handle 4 of the female blade.

The male blade extends forwardly at an upward incline from its shank and at its front end this blade is formed with a tapered or triangular head 14, the portion 15 of the blade rearwardly of the head being bent to extend forwardly at a downward incline so that the head will be disposed parallel to the blade 2 and fit snugly in the tapered forward end portion 5 of the opening 4 when the male blade is swung downwardly to the position shown in Figure 3. This head is sharpened along its side edge faces 16 and rear portions of these side edge faces are bevelled to form cam surfaces 17 which engage the converging edges of the tapered end 5 of the opening 4 and serve as guides for directing the head into the tapered front end portion of the opening in the female blade and impart a sliding movement to the male blade when the male blade is swung downwardly to a cutting position. An opening or slot 18 is formed intermediate the length of the diagonally extending portion of the male blade and at opposite sides of this opening are provided ears 19 carrying a pivot pin 20 which has its end portions projecting from opposite sides of the male blade and engaged through the slots 8. The male blade will thus be pivotally connected with the female blade and may be shifted longitudinally of the female blade in order to cause the head 14 to fit properly in the tapered front end 5 of the opening 4 when male blade is swung downwardly during a cutting motion. The male blade must be urged forwardly and in order to do so there has been provided a spring 21 which is formed from a strip of resilient metal. This spring extends longitudinally of the two blades and over the male blade with its downwardly offset rear end portion 22 disposed in the seat 11 for abutting engagement with the lip 10. The front end portion of the spring is bent to form a hook 23 having a bill 24, and when the hook is disposed between the ears 19 with its bill about the rear surface of the pin 20 this spring will exert forward pressure upon the pin and urge the male blade forwardly until its ends are at front ends of the slots 8.

When this implement is in use it is grasped by its handles, a thumb being passed through the handle 4 and one or more fingers being passed through the handle 13 so that the notch cutter will be held in one hand and the blade 1 may be swung towards the blade 2. The marginal portion of the pattern and the dress goods to be notched will then be engaged between the blades, with the blade 2 under the dress goods and the blade 1 over the pattern, and the notching scissors shifted along the pattern until the tapered end portion 5 of the opening 4 is directly under a notch marked upon the margin of the pattern and the head 14 disposed over the notch. Pressure is then applied to the handles and the blade 1 will be swung downwardly the blade and during this movement the bevelled edges 17 of the head 14 will guide the head into the tapered end 5 of the slot 4. At the same time the male blade will be shifted rearwardly a short distance against action of the spring 21 by the cam surfaces 17 and as the head 14 moves into the tapered front end of the opening 5 shearing action will take place along the sharpened edges of the two blades and a portion of the marginal edge of the dress goods cut out to form a V-shaped notch exactly corresponding in size and location to the notch marked upon the pattern. When pressure upon the handles is relieved the blade 1 may be returned to its raised position and it will be yieldably held in the normal position shown in Figure 1 by action of the spring. The notches will therefore be easily and accurately formed in the dress goods.

Having thus described the invention, what is claimed is:

1. Notching scissors comprising a female blade formed with a longitudinally extending opening having its forward portion tapered to provide side walls intersecting at their front ends, a male blade passing through said opening and mounted for pivotal movement and also sliding movement longitudinally of the opening, said male blade having its front end portion substantially triangular and provided with side edges sharpened and converging forwardly and intersecting at their front ends for cooperating with the forwardly converging walls of the opening and cutting a V-shaped notch in material engaged between the blades, the converging side edges of the male blade being formed with cam faces engaging side walls of the opening in the female blade and serving to effect the sliding movement of the male blade, and a spring urging the male blade forwardly.

2. Notching scissors comprising a female blade formed with a longitudinally extending opening having its forward portion tapered to provide side walls intersecting at their front ends, a male blade passing through said opening and having its forward end portion bent downwardly and then forwardly to form a head downwardly offset from the body portion of the male blade, said head being triangular and having its forwardly converging side edges sharpened, flanges extending along side edges of the opening rearwardly of the tapered front end portion thereof and formed with longitudinally extending slots, a pin mounted across the body portion of the male blade transversely thereof and engaged in said slots to pivotally and slidably mount the male blade, the converging side edges of the male blade being formed with cam faces engaging side walls of the opening in the female blade and serving to effect the sliding movement of the male blade, and a spring carried by the female blade and engaging said pin to urge the male blade forwardly.

3. Notching scissors comprising a female blade formed with a longitudinally extending opening having its forward portion tapered to provide side walls intersecting at their front ends, a male blade passing through said opening and having its forward end portion bent downwardly and then forwardly to form a head downwardly offset from the body portion of the male blade, said head being triangular and having its forwardly converging side edges sharpened, flanges extending along side edges of the rear portion of the opening and formed with longitudinally extending slots, a transversely extending flange between rear ends of the side flanges and having a forwardly extending lip, ears carried by the male blade, a pin passing through said ears and having end portions passing through the slots and serving to pivotally and slidably mount the male blade, the converging side edges of the male blade being formed with cam faces engaging side walls of the opening in the female blade and serving to effect the sliding movement of the male blade, and a spring consisting of a resilient strip having its rear end engaged under the lip and its front end formed with a bill engaging the pin and urging the male blade forwardly.

YOLANDA HELEN MUSSELWHITE.
JOSEPH ARTHUR MUSSELWHITE.

REFERENCES CITED

The following references are of record in the file of this patent:

UNITED STATES PATENTS

| Number | Name | Date |
|---|---|---|
| 270,967 | Merriam | Jan. 23, 1883 |
| 395,342 | Nakashjian | Jan. 1, 1889 |
| 1,667,985 | Purnell | May 1, 1928 |
| 2,041,523 | Bunnell | May 19, 1936 |
| 2,224,226 | Jensen | Dec. 10, 1940 |
| 2,473,073 | Rembold | June 14, 1949 |